United States Patent
Seo et al.

(10) Patent No.: US 10,760,575 B2
(45) Date of Patent: Sep. 1, 2020

(54) ELECTRIC COMPRESSOR HAVING ELECTRICAL CONNECTION UNIT, AND STATOR ASSEMBLY FOR THE SAME

(71) Applicant: Hanon Systems, Daejeon (KR)

(72) Inventors: Jeong Ki Seo, Daejeon (KR); Il Young Park, Daejeon (KR); Kyung Jae Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 15/742,158

(22) PCT Filed: Nov. 7, 2016

(86) PCT No.: PCT/KR2016/012753
§ 371 (c)(1),
(2) Date: Jan. 5, 2018

(87) PCT Pub. No.: WO2018/084345
PCT Pub. Date: May 11, 2018

(65) Prior Publication Data
US 2019/0277290 A1    Sep. 12, 2019

(51) Int. Cl.
*F04C 29/00* (2006.01)
*H02K 5/22* (2006.01)
(Continued)

(52) U.S. Cl.
CPC .......... *F04C 29/0085* (2013.01); *F04B 35/04* (2013.01); *F04B 39/12* (2013.01);
(Continued)

(58) Field of Classification Search
CPC ............ H02K 5/00; H02K 5/22; H02K 5/225; H02K 7/00; H02K 7/14; F04C 29/00;
(Continued)

(56) References Cited

U.S. PATENT DOCUMENTS

2002/0047365 A1   4/2002  Yagyu et al.
2010/0209266 A1*  8/2010  Ikeda ................ F04B 35/04
                                              417/410.1

FOREIGN PATENT DOCUMENTS

CN    203312975 U    11/2013
CN    103573578 A    2/2014
(Continued)

OTHER PUBLICATIONS

International Search Report issued in PCT/KR2016/012753 on Jul. 21, 2017.

*Primary Examiner* — Tran N Nguyen
(74) *Attorney, Agent, or Firm* — Norton Rose Fulbright US LLP; James R. Crawford

(57) ABSTRACT

Disclosed herein is an electric compressor having an electrical connection unit. The electric compressor may include: a compression unit configured to compress working fluid; an electrically-driven unit configured to drive the compression unit, and including a stator fixed in an inner surface of a housing, and a rotor rotatably disposed inside the stator; the housing including a partition provided to define a space in which the electrically-driven unit is received; a plurality of electrical connection pins connected electrically to the electrically-driven unit, and disposed through the partition in a longitudinal direction of the housing; and a controller disposed on a rear surface of the partition.

17 Claims, 12 Drawing Sheets

(51) Int. Cl.
*H02K 7/14* (2006.01)
*F04B 35/04* (2006.01)
*F04C 29/02* (2006.01)
*F04B 39/14* (2006.01)
*F04C 18/02* (2006.01)
*F04B 39/12* (2006.01)

(52) U.S. Cl.
CPC .......... *F04B 39/14* (2013.01); *F04C 18/0215* (2013.01); *F04C 29/02* (2013.01); *H02K 5/225* (2013.01); *H02K 7/14* (2013.01); *F04C 2240/30* (2013.01); *F04C 2240/40* (2013.01); *F04C 2240/803* (2013.01)

(58) Field of Classification Search
CPC .... F04C 29/008; F04C 29/0085; F04B 39/00; F04B 39/06; F04B 39/12; F04B 35/00; F04B 35/04
See application file for complete search history.

(56) References Cited

FOREIGN PATENT DOCUMENTS

| | | | |
|---|---|---|---|
| CN | 107044401 A | | 8/2017 |
| JP | 2002371983 A | | 12/2002 |
| JP | 2003148343 A | | 5/2003 |
| JP | 2004044555 A | | 2/2004 |
| JP | 2005207328 A | | 8/2005 |
| JP | 2013148037 | * | 8/2013 |
| JP | 2016217291 A | | 12/2016 |
| KR | 20100027958 A | | 3/2010 |
| KR | 20110018912 A | | 2/2011 |
| KR | 20130094656 A | | 8/2013 |
| KR | 20150080400 A | | 7/2015 |
| KR | 20160082205 A | | 7/2016 |

* cited by examiner

ELECTRIC COMPRESSOR HAVING ELECTRICAL CONNECTION UNIT, AND STATOR ASSEMBLY FOR THE SAME

CROSS-REFERENCES TO RELATED APPLICATIONS

This application is a 371 of International Application No. PCT/KR2016/012753 filed Nov. 7, 2016.

TECHNICAL FIELD

Exemplary embodiments of the present invention relate to an electric compressor having an electrical connection unit, and a stator assembly for the electric compressor, and more particularly, to a compressor of a type equipped with a motor for driving the compressor.

BACKGROUND ART

An electric compressor refers to a compressor including a compression unit configured to compress target material in a housing, and an electrically-driven unit, i.e., a motor, configured to drive the compression unit. The electric compressor includes a power source terminal configured to receive power for driving the built-in motor from an external device. The power source terminal includes an electrically connection pin provided for electrical connection with a controller provided in the compressor housing.

In the case of a compressor using a 3-phase motor, three electrical connection pins are provided. Typically, the three electrical connection pins are disposed parallel to each other around a stator. The electrical connection pins are disposed to protrude out of a motor housing, and are coupled with terminals provided in the controller. Therefore, three through holes are formed parallel to each other in the motor housing so that the three electrical connection pins pass through the respective through holes.

Pressure in the compressor is changed depending on the kind of refrigerant to be used. If refrigerant such as $CO_2$ is used, the interior of the compressor is maintained at a super-high pressure because a refrigeration cycle is operated in a supercritical region. In the case where super-high pressure refrigerant is used, the importance of sealing increases compared to that of the other cases. If, as described above, the three electrical connection pins are disposed parallel to each other, there is the possibility that excessively high stress is applied to regions between the through holes.

Such excessively high stress causes deformation of the housing around the through holes, thus leading to an increase in possibility of leakage of refrigerant.

To avoid the foregoing problem, there is need to reinforce the housing, e.g., by changing the material of the housing or increasing the thickness of the housing. However, it is not easy to use this method because it causes increases in the production cost and the weight of a product.

Furthermore, an assembly process is typically performed as follows: forming a single large through hole in lieu of the three through holes which are separately formed; and inserting, into the single through hole, a mounting plate to which the three electrical connection pins are fixed parallel to each other. However, in this structure, the higher the pressure in the compressor, the higher the possibility of removal of the mounting plate from the correct position. Thus, there is a problem in that the reliability of the product is reduced.

DISCLOSURE

Technical Problem

An embodiment of the present invention relates to a sterilization apparatus for a portable terminal, which is capable of being always carried along with a portable terminal and easily sterilizing the portable terminal while in motion without being limited to the place by constructing the sterilization apparatus using a casing or a cover attached to the portable terminal.

Technical Solution

An embodiment of the present invention relates to an electric compressor capable of reliably sealing junctions between electrical connection pins and portions enclosing the electrical connection pins, regardless of pressure in the compressor.

An embodiment of the present invention relates to an electric compressor capable of minimizing deformation of a compressor housing even when high-pressure refrigerant is used.

An embodiment of the present invention relates to a stator assembly for the electric compressor.

An electric compressor in accordance with an embodiment of the present invention may include: a compression unit configured to compress working fluid; an electrically-driven unit configured to drive the compression unit, and including a stator fixed in an inner surface of a housing, and a rotor rotatably disposed inside the stator; the housing including a partition provided to define a space in which the electrically-driven unit is received; a plurality of electrical connection pins connected electrically to the electrically-driven unit, and disposed through the partition in a longitudinal direction of the housing; and a controller disposed on a rear surface of the partition. The plurality of electrical connection pins may be disposed in the form of a triangle on the partition.

In an embodiment, the electric compressor may further include a mounting plate to which the plurality of electrical connection pins are fixed, and which has a surface facing the housing.

In an embodiment, the mounting plate may be fixed relative to the stator.

In an embodiment, the electric compressor may further include a cover having a first surface fixed to the stator, and a second surface into and to which the mounting plate is inserted and fixed.

In an embodiment, the electric compressor may further include a fixing unit configured to fix the mounting plate to the partition. The fixing unit may be disposed so as to be approachable in the housing.

In an embodiment, the fixing unit may include a plurality of bolts, and a head of each of the bolt may be disposed in the housing.

In an embodiment, each of the plurality of electrical connection pins may have a first end fixed to the mounting plate, and a second end disposed to pass through the partition and protrude toward the controller.

In an embodiment, the plurality of electrical connection pins may be directly electrically connected with a coil provided on the stator.

In an embodiment, the electric compressor may further include an electrical connection unit configured to electrically connect the electrical connection pins with a coil provided on the stator.

In an embodiment, the electrical connection unit may be fixed to the cover.

In an embodiment, the electrical connection unit may include a first side connected with the coil provided on the stator, and a second side having an insert hole into which a corresponding one of the electrical connection pins is inserted.

In an embodiment, the plurality of electrical connection pins may be circumferentially disposed around a driving shaft provided in the electrically-driven unit.

In an embodiment, ends of the electrical connection pins that are disposed inside the housing may remain fixed between the stator and the partition by the cover.

An electric compressor in accordance with an embodiment of the present invention may include may include: a compression unit configured to compress working fluid; an electrically-driven unit configured to drive the compression unit, and comprising a stator, and a rotor rotatably disposed inside the stator; a controller configured to control operation of the electrically-driven unit; a housing in which the stator of the electrically-driven unit is fixed, and which includes a partition provided to define a motor receiving space and a controller receiving space; and a plurality of electrical connection pins configured to pass through the partition and electrically connect the electrically-driven unit with the controller. The plurality of electrical connection pins may be disposed on the partition in a circular region having a diameter less than an outer diameter of the stator.

In an embodiment, a boss configured to receive a rotating shaft coupled to the rotor may be provided on a motor receiving space-side surface of the partition, and a diameter of the circular region may be larger than an outer diameter of the boss.

In an embodiment, the plurality of electrical connection pins may be disposed on a circumference of a circle.

In an embodiment, the plurality of electrical connection pins may be disposed at angular intervals of 120°.

In an embodiment, when the number of electrical connection pins is n, the circular region may be partitioned into n regions at angular intervals of 360/n°, and one electrical connection pin may be disposed in each of the partitioned regions.

A stator assembly in accordance with an embodiment of the present invention may include: a stator core; a coil wound around the stator core; a plurality of electrical connection pins electrically connected with the coil, and extending in a longitudinal direction of the stator core; and a fixing unit configured to fix the plurality of electrical connection pins such that the electrical connection pins face one end of the stator core.

In an embodiment, the fixing unit may include a mounting plate to which the plurality of electrical connection pins are fixed.

In an embodiment, the fixing unit may include a cover configured to fix the mounting plate to the one end of the stator core.

In an embodiment, the cover may have an annular shape with an opening in a central portion thereof, and the electrical connection pins may be disposed to face one surface of the cover.

Advantageous Effects

In an electric compressor in accordance with embodiments of the present invention, electrical connection pins can be disposed on a partition provided in a housing, so that an increase in the diameter of the housing can be minimized.

Furthermore, due to pressure of refrigerant in the housing, a mounting plate is pushed toward the partition. Thus, refrigerant can be prevented from leaking between the electrical connection pins and the housing. Consequently, even when high-pressure refrigerant is used, the sealing performance can be reliably maintained.

Furthermore, because through holes, through which the electrical connection pins pass, are disposed at arbitrary positions in the partition, deformation of the regions of the housing between the through holes can be minimized. Since the mounting plate functions as a reinforcement member against the pressure of the refrigerant, the deformation of the housing can be further reliably prevented.

In addition, the electric compressor includes an additional cover which is fixed to the stator, and into which the mounting plate is inserted. Thus, during a manufacturing process, the electrical connection pins can be stably placed on the stator.

Furthermore, a fixing unit for fixing the mounting plate to the partition is disposed so as to be approachable in the housing, so that operation of tightening the fixing unit can be facilitated, and the overall structure of the housing can also be simplified.

Furthermore, the electric compressor includes a separate electrical connection unit for electrically connecting the electrical connection pins with a coil provided on the stator, whereby the electrical connection therebetween can be easily achieved and reliably maintained.

MODE FOR INVENTION

Hereinafter, embodiments of an electric compressor in accordance with the present invention will be described in detail with reference to the attached drawings.

Figure 1:
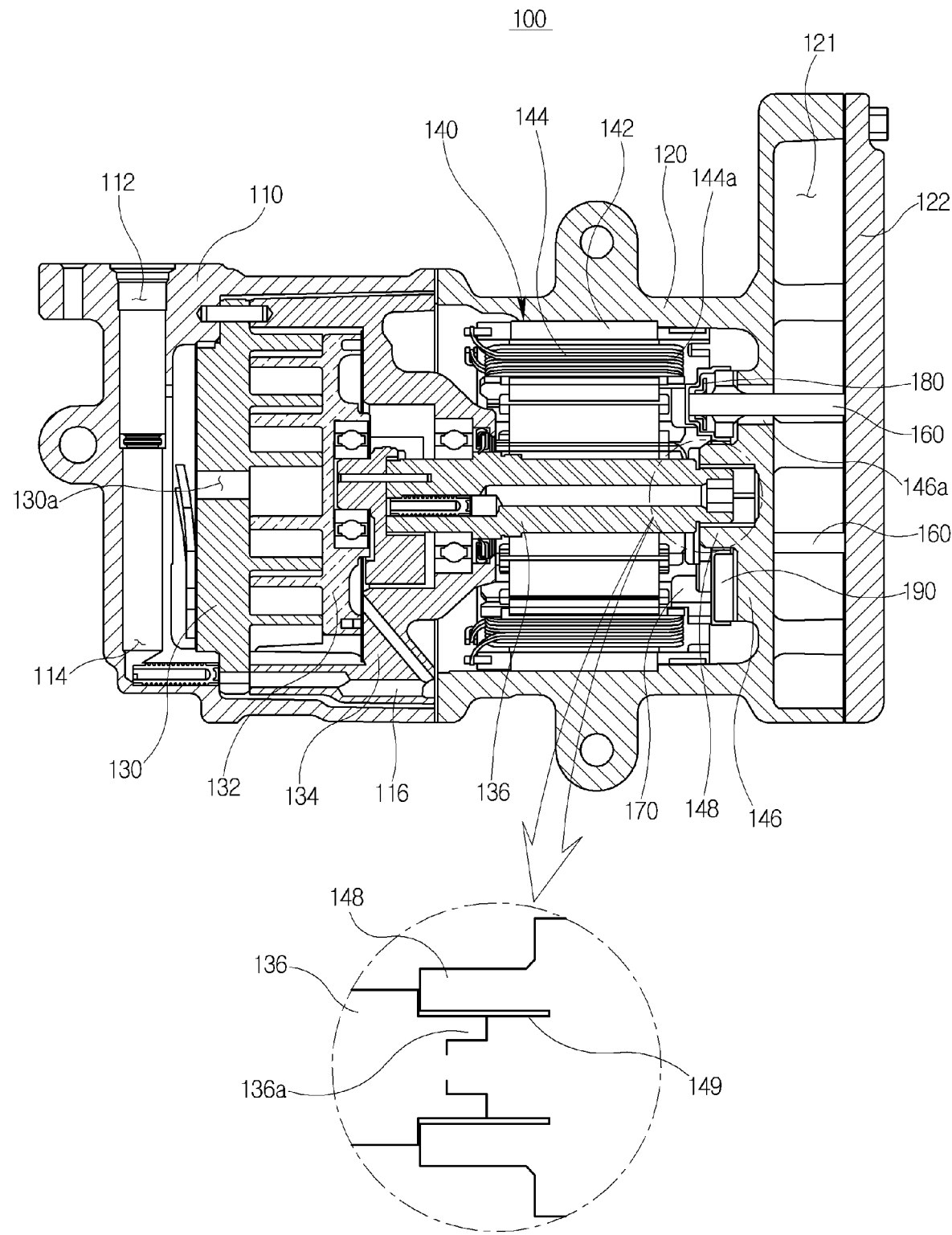
FIG. 1 is a sectional view illustrating an embodiment of an electric compressor in accordance with the present invention.

Referring to FIG. 1, there is illustrated a first embodiment 100 of the electric compressor in accordance with the present invention. The first embodiment 100 includes a main housing 110 configured to house a compression unit, which will be described later herein, and a motor housing 120 configured to house a motor to be used as a driving unit. Furthermore, a controller receiving space 121 for receiving a controller (not shown) configured to control power to be supplied to the motor is formed in a right end of the motor housing 120. A controller cover 122 is coupled to the right end of the motor housing 120 to cover the receiving space 121.

The main housing 110 houses the compression unit including a stationary scroll 130 and a rotational scroll 132. The stationary scroll and the rotational scroll can employ well-known structures; therefore, detailed description of the shapes and operational principles thereof will be omitted. The compression unit is not limited to that shown in the drawing, and any apparatus unit having arbitrary shape and structure that can be operated by a motor may be used as the compression unit.

The rotational scroll 132 is supported on a fixed frame 134 and configured to be rotatable relative to the stationary scroll 130. A rotating shaft 136 is rotatably installed in the fixed frame 134. The rotating shaft 136 is coupled with the rotational scroll 132 such that the rotational scroll 132 is eccentrically rotated.

An outlet port 112 is formed around a left end of the main housing 110. The outlet port 112 communicates with an outlet hole 130a formed in the stationary scroll 130 so that compressed refrigerant can be discharged out of the compressor through the outlet port 112. The outlet port 112 has the form of a pipe extending in the vertical direction based on FIG. 1. An oil storage space 114 suitable for collecting and temporarily storing oil to be discharged along with the refrigerant is formed below the outlet port 112. The oil storage space 114 communicates with a low-pressure space (an intake space) of an internal space of the embodiment through an oil passage 116 so that collected oil can return to the interior of the housing.

The motor housing 120 is formed separately from the main housing 110 and integrally coupled thereto by an arbitrary unit (not shown). As needed, the motor housing and the main housing may be integrally formed.

In the motor housing 120, a stator 140 is fixed to an inner surface of the motor housing 120 by a thermal press-fitting method. The stator may be fixed by other methods in lieu of the thermal press-fitting method. The stator 140 includes a core 142 formed by stacking electric steel sheets each of which has a thin film shape, and a coil 144 wound around the core 142. The coil 144 has opposite ends protruding from the surface of the core 142. Each of the protruding ends may be referred to as a core end 144a.

A rotor 150 is disposed in a central portion of the stator 140. The rotor 150 is disposed such that an outer circumferential surface of the rotor 150 is spaced apart from an inner circumferential surface of the stator 140 by a predetermined distance. The rotating shaft 136 is installed in a central portion of the rotor 150. Therefore, the rotor 150 and the rotating shaft 136 integrally rotate. Furthermore, a right end (based on FIG. 1) of the rotating shaft 136 is installed in a boss 148 formed in a partition 146 of the motor housing 120, with a journal bearing 149 interposed therebetween. In other words, the journal bearing 149 is disposed on an inner surface of the boss 148. An end part 136a of the rotating shaft 136 is inserted into the journal bearing 149 so that the rotating shaft can be rotatably supported in the boss.

In the embodiment shown in the drawing, the motor housed in the motor housing may have the form of a 3-phase motor using a 3-phase power source. In this case, coils corresponding to three phases are wound around the core. The controller (not shown) suitable for controlling the rotor to rotate at a desired rotating speed by applying current to the coils is received in the controller receiving space 121 of the motor housing 120. The controller typically has the form of a PCB substrate provided with an inverter circuit. The inverter circuit of the PCB substrate should be electrically connected with the coils.

To this end, an electrical connection pin 160 is provided adjacent to the stator. In detail, three electrical connection pins 160 are provided and respectively connected with the 3-phase coils. Each of the electrical connection pins should be electrically connected to the corresponding coil and the PCB substrate.

Here, the partition 146 is formed to separate a motor receiving space of the motor housing from the controller receiving space 121. Hence, an electrical connection hole 146a is formed in the partition 146 to allow each electrical connection pin 160 to extend from the motor receiving space into the control receiving space. In other words, since the electrical connection pin 160 extends from the radial inside of the stator 140 to the controller through the partition, an inner diameter of the motor 120 can be substantially the same as an outer diameter of the core 142 of the stator. This structure is different from that of the conventional motor housing in which the electrical connection pin is disposed radially outside the stator. Thanks to this structure of the present invention, the diameter of the motor housing can be reduced.

A cover 170 suitable for covering upper surfaces (right end surfaces based on FIG. 1) of the coil ends of the stator is additionally disposed. A terminal 180, a mounting plate 190, and a gasket 200 are disposed on the cover 170. The terminal 180 electrically connects the coils 144 with the electrical connection pins 160. The mounting plate 190 supports the electrical connection pins 160 thereon. The gasket 200 is disposed between the mounting plate 190 and the partition 146. Hereinafter, detailed descriptions of the respective components will be made.

Figure 2:
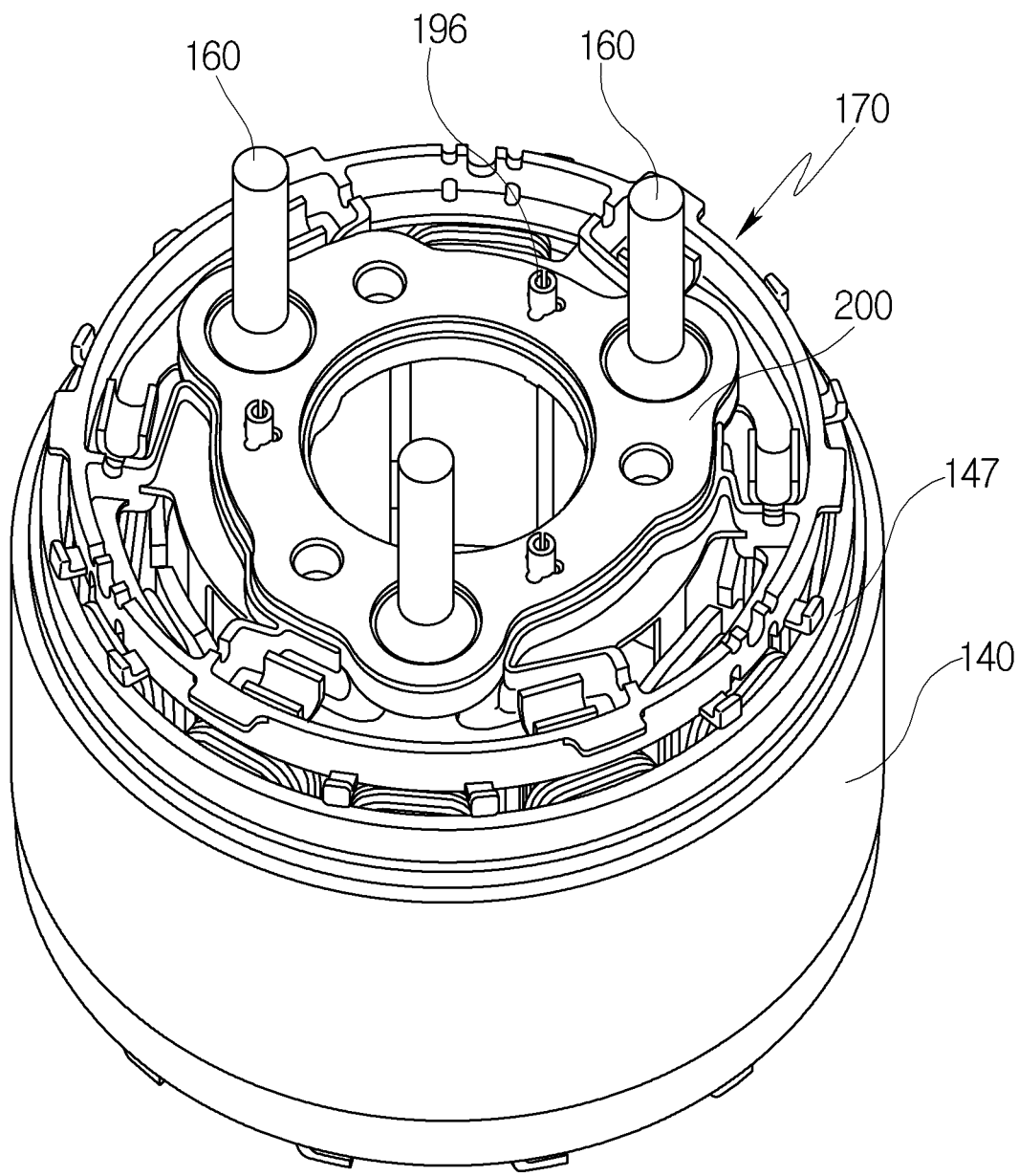
FIG. 2 is a perspective view illustrating a stator assembly in the embodiment shown in FIG. 1.
Figure 3:
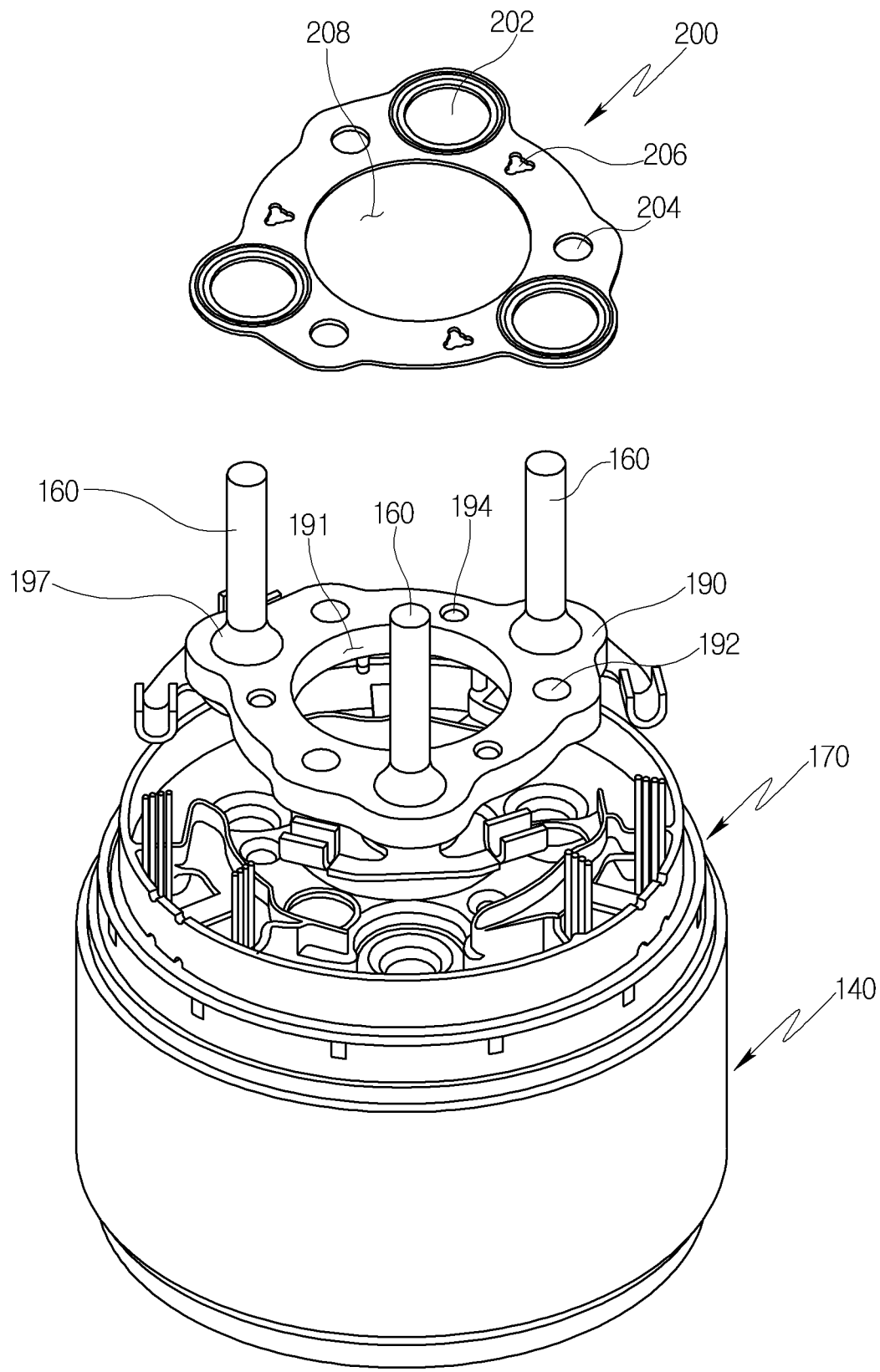
FIG. 3 is an exploded perspective view illustrating the stator assembly shown in FIG. 2.

Referring to FIGS. 2 and 3, the mounting plate 190 has an overall triangular shape. A first boss insert hole 191, through which the boss 148 of the motor housing 120 passes, is formed in a central portion of the mounting plate 190. The first boss insert hole 191 has an approximately circular shape corresponding to the shape of the boss 148. The three electrical connection pins 160 are disposed on the surface of the mounting plate 190 at positions approximately corresponding to the vertices of a regular triangular. In each of spaces between the electrical connection pins 160, a bolt insert hole 192 and a guide pin insert hole 194 are formed in the mounting plate 190.

The bolt insert hole 192 allows a coupling bolt, which will be described later herein, to pass therethrough, and has an approximately circular cross-section. The guide pin insert hole 194 allows a guide pin 196, which will be described later herein, to be inserted and fixed therein. The guide pin 196 functions to enable the gasket to remain coupled to the mounting plate 190 during a process of assembling the electric compressor. Each electrical connection pin 160 is embedded into the mounting plate and includes a sealing part 197 for preventing the embedded electrical connection pin 160 from being removed therefrom. The sealing part 197 may be made of flexible material such as silicon. When the mounting plate 190 is pushed onto the partition 146 by the bolts, the sealing part 197 is pushed into the corresponding electrical connection hole 146a formed in the partition 146 (refer to FIG. 1). Thereby, the mounting plate and the electrical connection pins can be prevented from coming into direct contact with each other. Consequently, the mounting plate can remain insulated from the electrical connection pins. As needed, to increase the electric insulation, the mounting plate may be made of synthetic resin.

The gasket 200 is disposed on an upper surface (based on FIGS. 2 and 3) of the mounting plate 190. In detail, the gasket 200 has connection pin insert holes 202 through which the electrical connection pins 160 pass, bolt insert holes 204 through which the bolts are inserted, and guide pin insert holes 206 into which the guide pins 196 are inserted. Furthermore, a third boss insert hole 208 is formed in a central portion of the gasket 200 so that the boss 148 is inserted into the third boss insert hole 208.

The bolt insert holes 204 are disposed to be aligned with the respective bolt insert holes 192 formed in the mounting plate 190, thus allowing the bolts functioning as fixing means to be fastened to the partition 146 of the housing. The guide pin insert holes 206 are formed at positions corresponding to the respective guide pins to be inserted into the mounting plate, and each have an approximately triangular shape. Here, an inner diameter of each bolt insert hole is slightly greater than an outer diameter of the corresponding bolt to be inserted thereinto so that the bolt can be easily inserted into the bolt insert hole, whereas each guide pin insert hole 206 has a size smaller than that of the corresponding guide pin so that, if the guide pin is inserted thereinto, the gasket 200 can remain fixed to the mounting plate 190 by the guide pins.

The three electrical connection pins 160 are arranged in the form of an approximately regular triangle, as described above. In other words, the three electrical connection pins 160 are disposed at regular angular intervals of 120 degrees on the circumference of a circle with a center O of the rotor as the center thereof. In addition, the diameter of the circle C passing through three points at which the three electrical connection pins are disposed is smaller than the outer diameter of the stator core and greater than an inner diameter of the third boss insert hole 208 formed in the gasket 200.

Here, an annular region defined by the outer diameter of the stator core and the third boss insert hole may be referred to as a usable region. The usable region is defined as a space in which the three electrical connection pins 160 can be disposed. In the embodiment shown in the drawings, there is illustrated an example in which the three electrical connection pins are arranged at regular angular intervals of 120 degrees in the usable region, as described above, but the present invention is not limited thereto. In other words, the three electrical connection pins may be disposed at arbitrary positions in the usable region.

For instance, the three electrical connection pins may be disposed at uneven positions in the usable region, or biased to one side in the usable region. In addition, the three electrical connection pins may be disposed at different distances from the center of the rotating shaft.

In the present embodiment, although the three electrical connection pins are provided, the number of electrical connection pins may be changed depending on alternating current power source to be used. For example, if a 5-phase power source is used, the distance between the electrical connection pins may be set to 72 degrees (360/5=72).

As such, because the electrical connection pins are disposed in the usable region, the shape of the motor housing can remain circular. In the case of the conventional technique, because the electrical connection pins are disposed on the side surface of the stator, a separate space for receiving the electrical connection pins is also required in the motor housing, whereby the shape of the motor housing is complex. This makes a process of machining the motor housing difficult. However, in the embodiment of the present invention, the shape of the motor housing can remain circular, so that the process of manufacturing the motor housing can be simplified, and the volume of the motor housing can be reduced.

Figure 4:
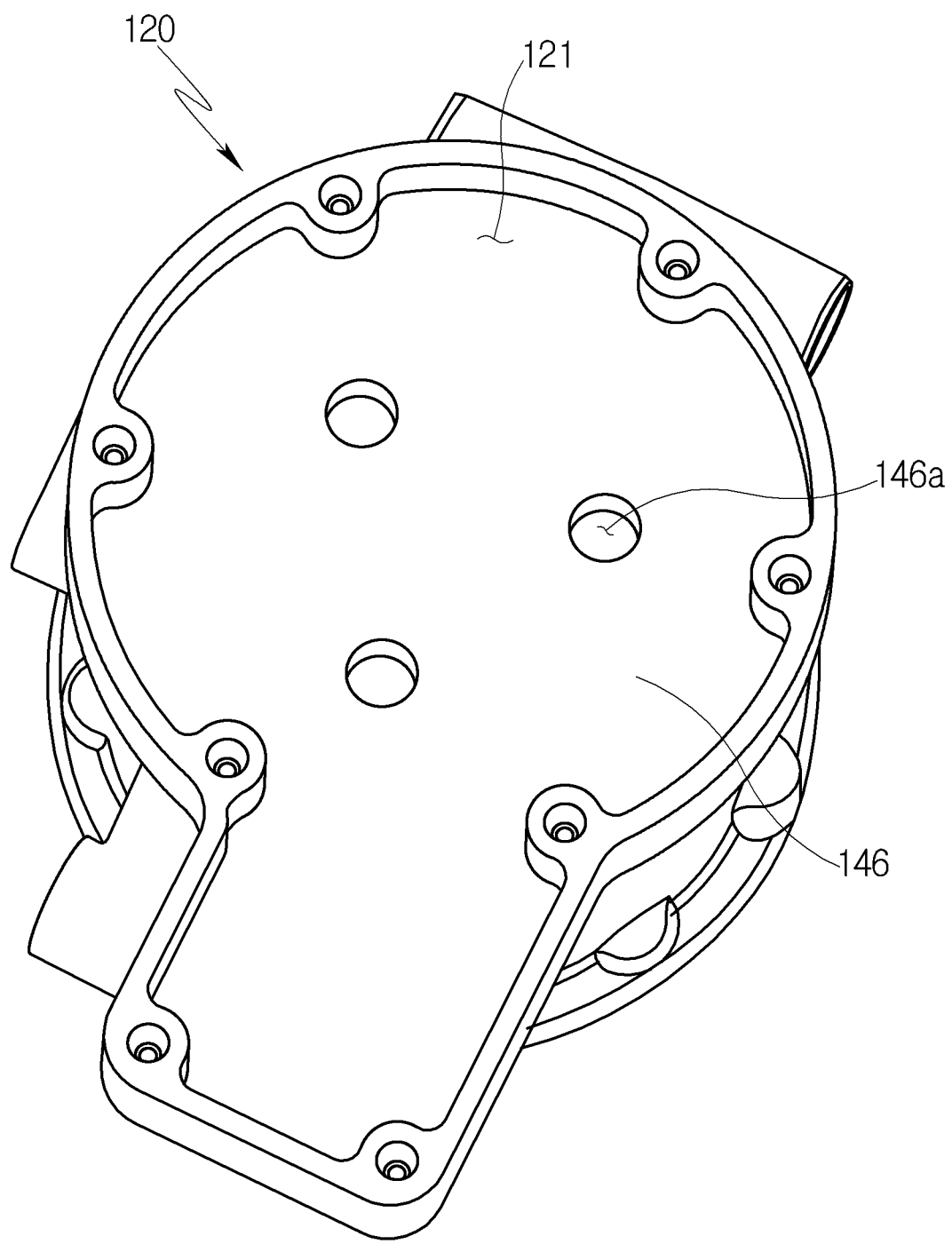
FIG. 4 is a perspective view showing an upper surface of a housing in the embodiment shown in FIG. 1.

Referring to FIG. 4, there is illustrated the controller receiving space 121 formed at a predetermined position in the motor housing. The controller receiving space 121 is separated from the motor receiving space by the partition 146. The electrical connection holes 146a are formed in the partition 146 so that the above-mentioned electrical connection pins are inserted into the respective electrical connection holes 146a. Although not shown, the controller may include the PCB substrate on which the inverter circuit configured of elements such as a power semiconductor is formed. The PCB substrate may be provided with terminals to be electrically connected with the electrical connection pins that pass through the respective electrical connection holes. Each of the terminals has an arbitrary elastic unit so that the terminal can reliably remain electrically connected with the corresponding protruding electrical connection pin.

Figure 5:
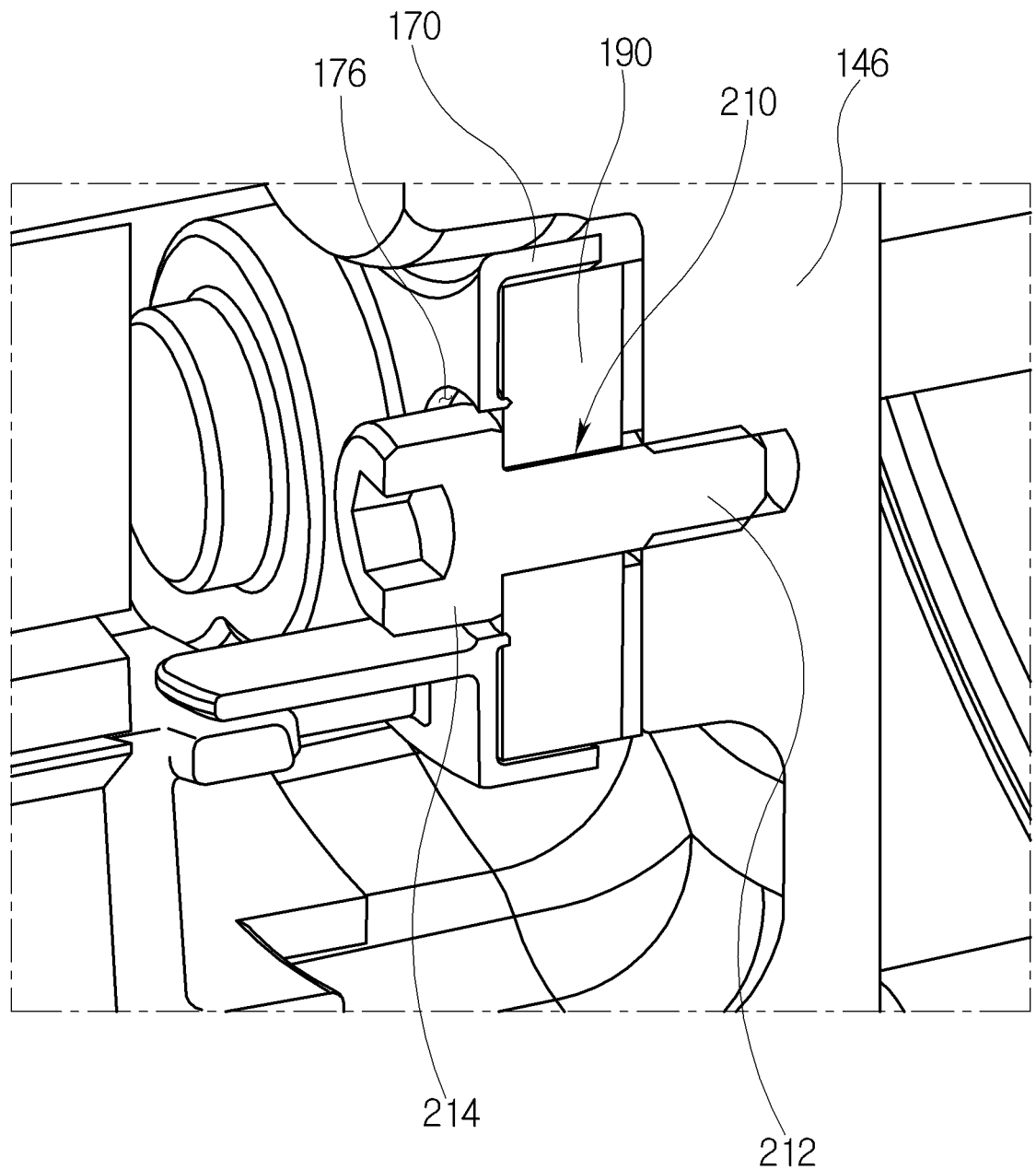
FIG. 5 is a partially enlarged view illustrating the coupling of a mounting plate and a partition in the embodiment shown in FIG. 1.

Referring to FIG. 5, there is illustrated the coupling of the cover and the mounting plate to the partition. The mounting plate 190 is inserted into and fixed to the cover, which will be described later herein, with the electrical connection pins 160 fixed to the mounting plate 190. The cover is fixed to the stator core. The cover and the mounting plate are fixed to the partition 146 by the above-mentioned fastening bolts 210. Each of the fastening bolts 210 includes an threaded part 212 which is inserted into and fixed to the partition 146, and a head 214 integrally formed with the threaded part 212.

As shown in the drawing, the head 214 is disposed in the motor receiving space of the motor housing. In other words, the head 214 is disposed so as to be approachable to the inner surface of the motor housing. Therefore, during a process of coupling the fastening bolt 210 to the partition, a tool such as a screwdriver may be inserted into the internal space of the motor housing and used to tighten the fastening bolt 210. The fastening bolts 210 forcibly push the mounting plate onto the partition and, simultaneously, make it possible for the gasket to be compressed between the partition and the mounting plate. Thereby, leakage through the electrical connection holes 146a can be prevented.

The space in which the head of the fastening bolt is disposed is space that is maintained at a high pressure compared to that of the outside of the motor housing or the controller receiving space. The higher the pressure of the refrigerant to be used, the larger the difference in pressure between this space and the outside is. Hence, the pressure in the motor housing is applied to the mounting plate and the gasket, whereby the leakage prevention performance can be further enhanced.

Figure 6:
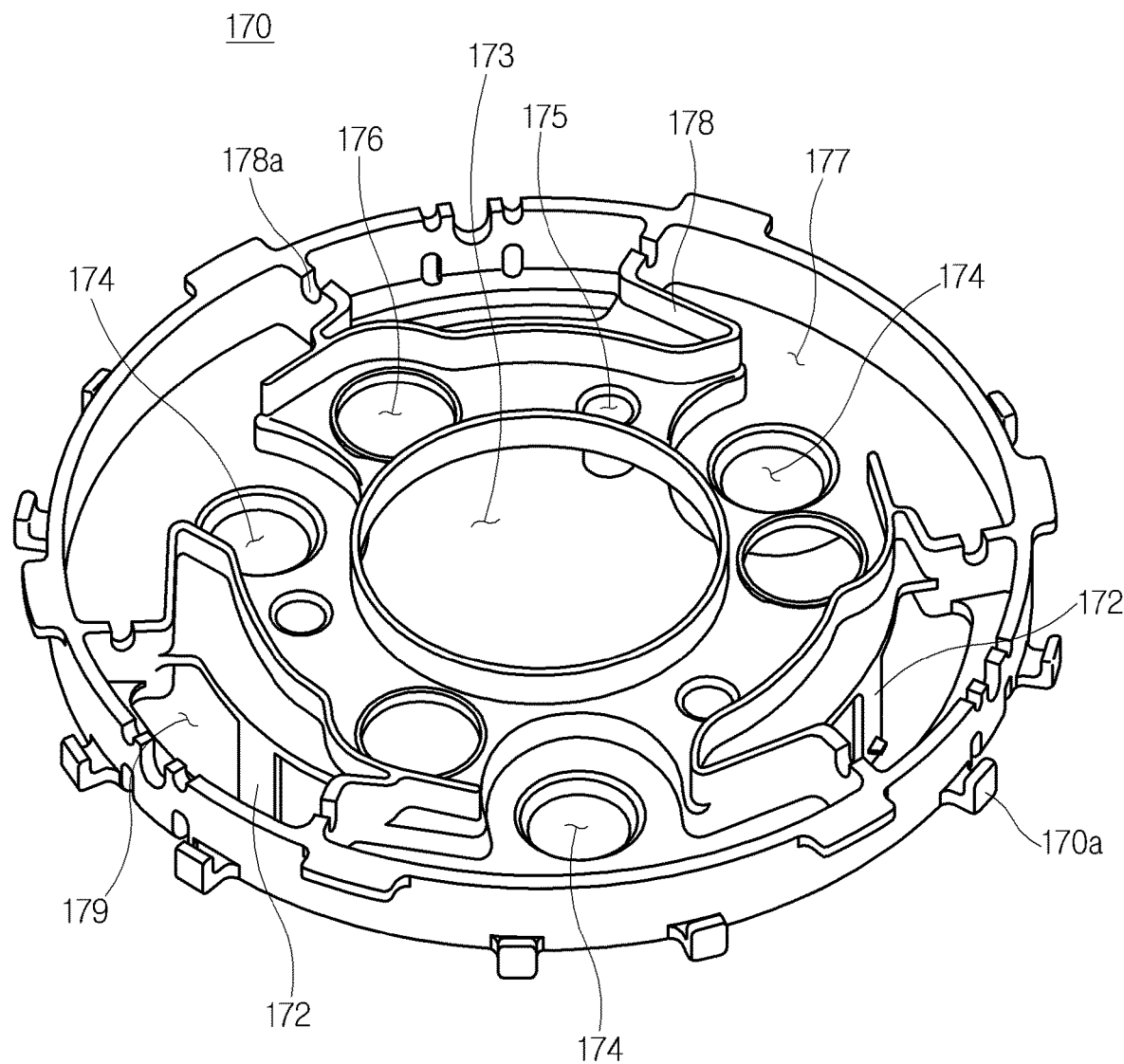
FIG. 6 is a perspective view illustrating a cover in the embodiment shown in FIG. 1.
Figure 7:
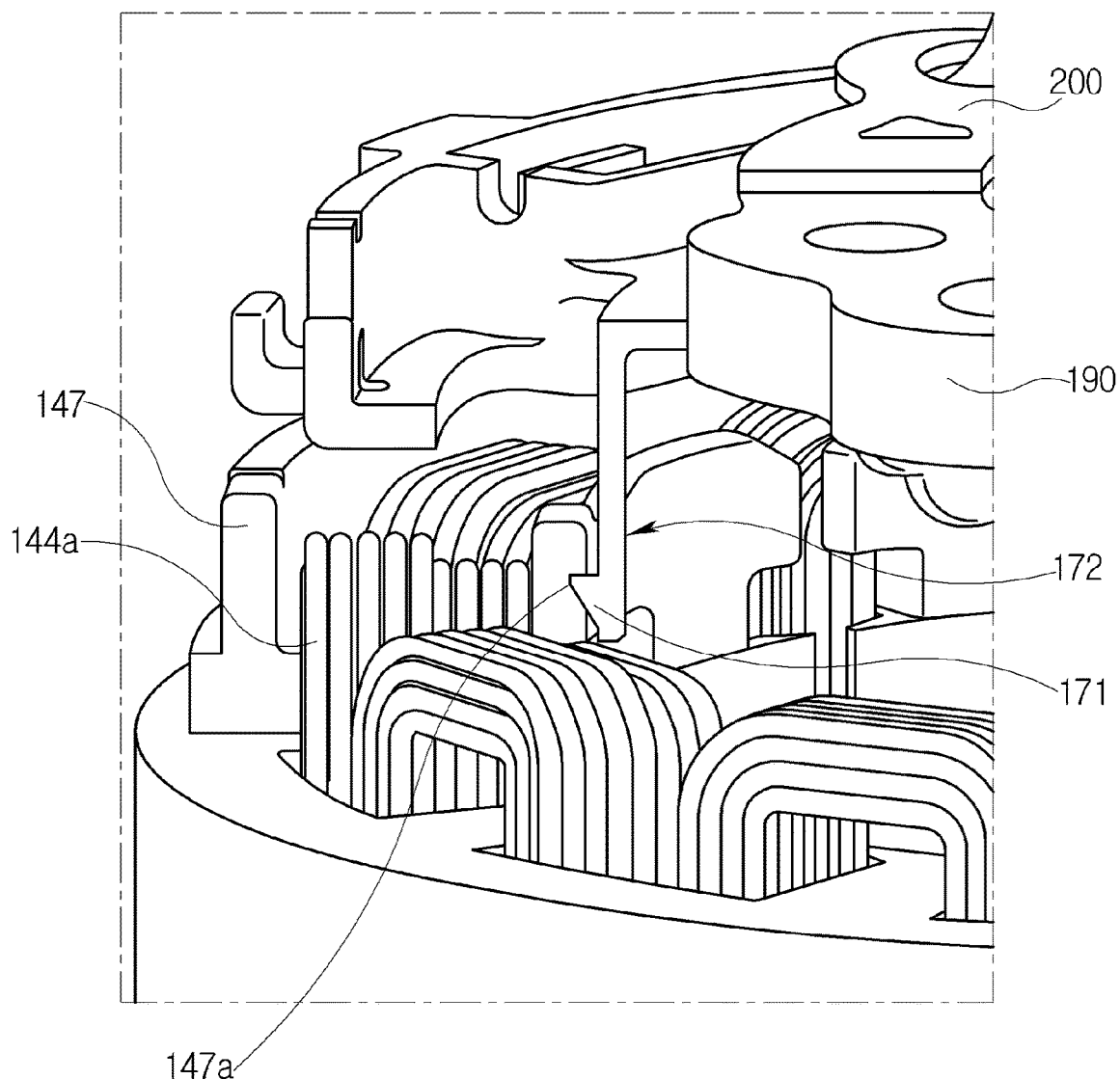
FIG. 7 is a partially enlarged view illustrating the coupling of the cover and a stator shown in FIG. 6.

The mounting plate 190 is inserted and fixed in the cover 170. Referring to FIGS. 6 and 7, the cover 170 has a circular shape with an inner diameter slightly less than the diameter of the core of the stator. The cover 170 is fixed to an upper part of a bobbin 147 installed on an end of the stator core. In detail, the bobbin 147 has a space, in which the coil end 144a is disposed, between an outer wall thereof and an inner wall. A depression 147a is formed in the inner wall. In an embodiment, a plurality of depressions 147a are formed in an inner surface of the inner wall of the bobbin 147. Hook parts 171 to be inserted into and locked to the respective depressions 147a are formed on a lower surface of the cover 170.

Each hook part 171 extends in the longitudinal direction of the rotating shaft 136 and has a wedge-shaped hook 172 on an end thereof. The hook 172 is elastically inserted into the corresponding depression 147a during an assembly process so that the cover 170 can remain fixed to the stator.

The upper surface of the cover 170 is partitioned into a plurality of spaces. A second boss insert hole 173, into which the boss 148 is inserted, is formed in a circular shape in a central portion of the cover 170. Three connection pin support parts 174 are formed around the second boss insert hole 173. Each connection pin support part 174 has a concave shape with an approximately circular cross-section. An end of each electrical connection pin 174 is received and fixed in the corresponding connection pin support part 174.

A guide pin support part 175 and a bolt insert hole 176 are provided between each of spaces between the three connection pin support parts 174. The guide pin support part 175 has a concave shape with a circular cross-section similar to that of the connection pin support part although there is a difference in size therebetween. The above-mentioned guide pins are inserted into and supported in the respective guide pin supports 175. The bolt coupling hole 176 is larger than the head 214 of the fastening bolt to allow the fastening bolt to completely pass therethrough. Thus, as shown in FIG. 5, when in the coupled state, the fastening bolt is disposed without coming into contact with the cover, thus pushing the mounting plate rather than the cover.

A terminal insert pat 177 is formed outside each connection pin support part 174 with respect to the radial direction. The terminal insert part 177 is defined by the partition 178 provided on the surface of the cover 170. The terminal insert part 177 has a shape corresponding to an outer shape of the terminal, which will be described later herein, to allow the terminal to be inserted thereinto. In detail, the terminal insert part 177 is formed to have an approximately arc shape within a predetermined angular range along the circumferential part of the cover. An approximately central portion of the terminal insert part 177 is connected to the connection pin support part 174.

The partition 178 defining the terminal insert part 177 has coil fixing depressions 178a at positions corresponding to the respective opposite ends of the terminal insert part 177. Each coil fixing depression 178a is formed such that the corresponding coil leading to a space above the cover through a corresponding one of the coil leading holes 179 formed between the terminal insert parts 177 can be inserted into and fixed in the coil fixing depression 178a. In this way, one coil fixing depression is formed in each of the opposite ends of each terminal insert part 177. An end of a coil having an arbitrary phase and an end of an adjacent coil having another phase are inserted into the respective coil fixing depressions.

A plurality of protrusions 170a are radially provided on an outer circumferential surface of the cover 170. The protrusions 170a come into contact with an upper surface of the bobbin 147 and support the cover 170 to enable the cover 170 to be disposed on an upper portion of the bobbin 147.

Figure 8:
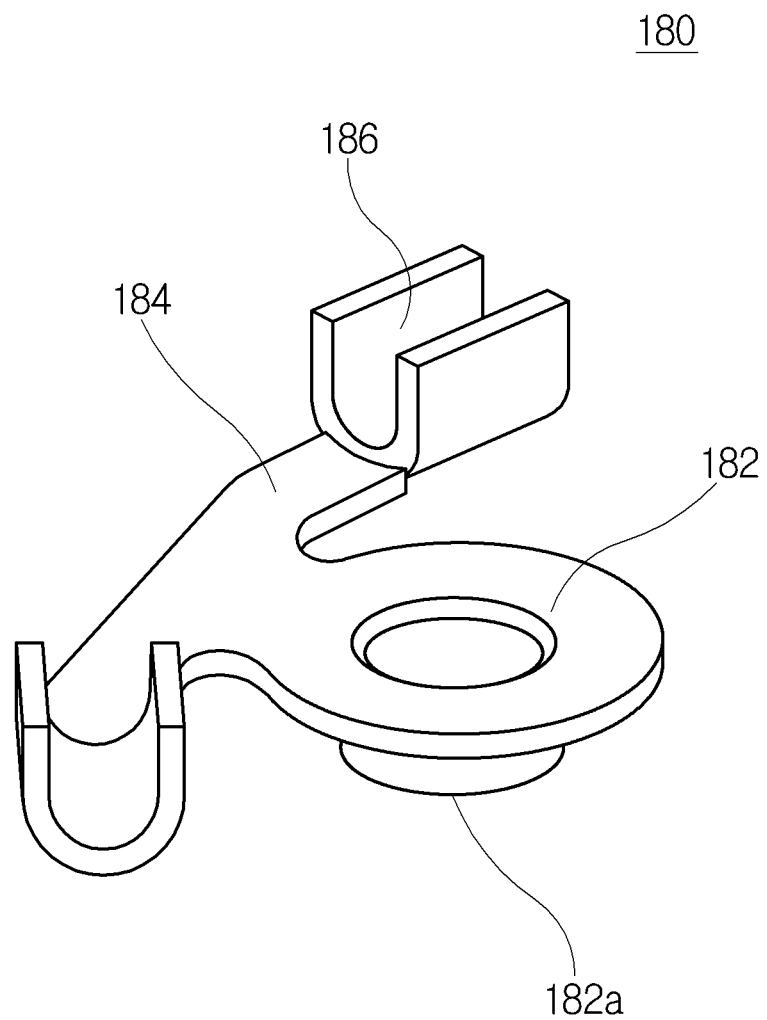
FIG. 8 is a perspective view illustrating an electrical connection unit in the embodiment shown in FIG. 1.

Referring to FIG. 8, there is illustrated the terminal 180. The terminal 180 includes a bus bar 184 extending in an approximately arc shape, and a connection pin press-fitting part 182 protruding inward from an intermediate portion of the bus bar 184. A sleeve 182a is provided on the connection pin press-fitting part 182 so that the electrical connection pin 160 can be press-fitted and fixed in the connection pin press-fitting part 182. An inner diameter of the sleeve 182a is less than an outer diameter of the electrical connection pin 160 to prevent the electrical connection pin inserted into the sleeve 182a from being undesirably removed therefrom. The bus bar 184 has a thin plate shape. In an embodiment of FIG. 8, the bus bar 184 has a linear shape with opposite ends bent at an angle.

A calking part 186 having an approximately 'U' shape is provided on each of the opposite ends of the bus bar 184. The calking part 186 is a part to be electrically connected with the end of the corresponding coil. After the end of the coil is disposed in the calking part, the coil can be fixed to the terminal by deforming the calking part using a separate tool. The terminal may be formed of a thin plate made of conductive metal such as aluminum or copper. Thereby, the calking part can be easily deformed.

Although there has been illustrated an example in which the terminals are provided to facilitate electrical connection between the coils provided on the stator and the electrical connection pins, the coils and the electrical connection pins may be directly connected to each other without using the terminals, as needed. In other words, the coils may physically come into contact with the corresponding electrical connection pins. In this case, each electrical connection pin may have a depression, a protrusion, or the like to enable the coil to be easily fixed to the electrical connection pin.

Figure 9:
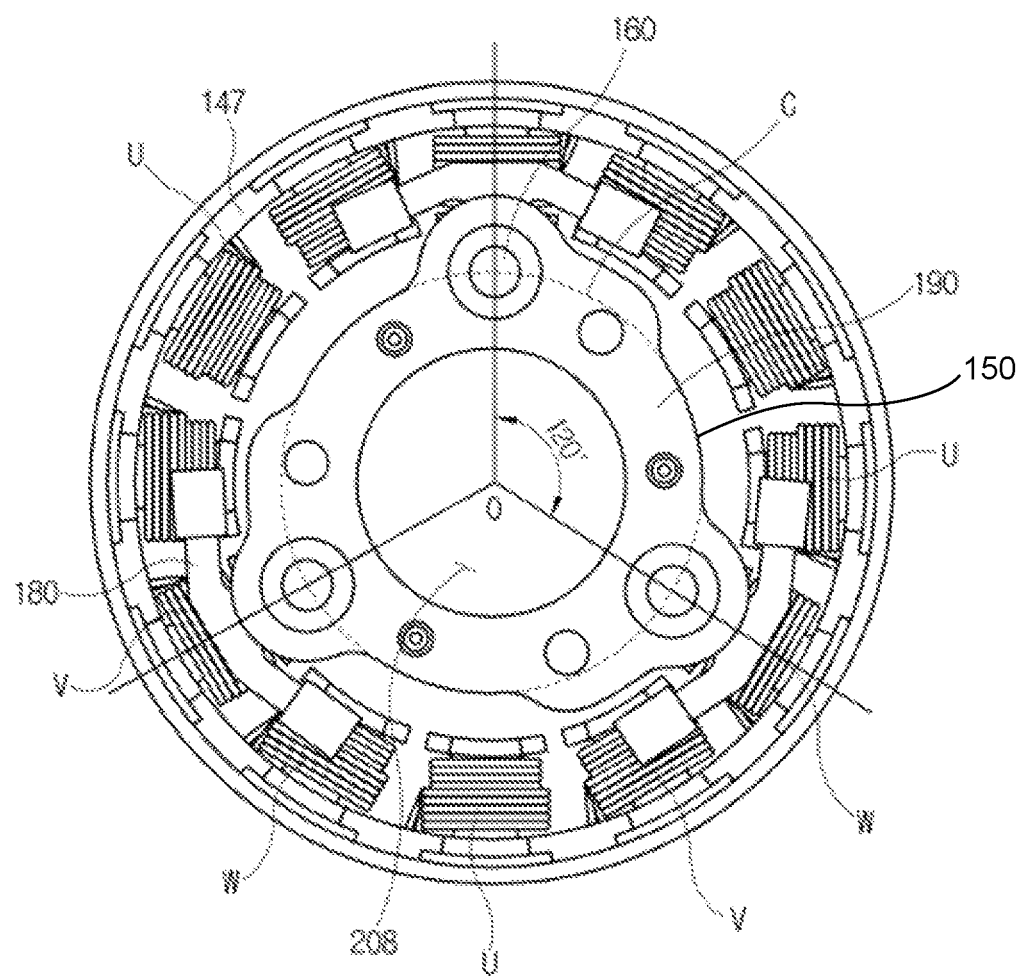
FIG. 9 is a plan view illustrating installation of the electrical connection unit shown in FIG. 8.

FIG. 9 is a plan view illustrating installation of the terminals 180. In the case of a 3-phase motor, one terminal is required for each phase, i.e., three terminals are needed. As shown in the drawing, for example, one end of a coil corresponding to a U phase may be connected to one end of the terminal that is located at a left lower portion in FIG. 9, and one end of a W-phase coil may be connected to the other end of the terminal. Likewise, the terminal that is located at a right lower portion may be connected with V-phase and U-phase coils. The three terminals are disposed on the circumference of a single circle such that they do not overlap each other with respect to the radial direction. Furthermore, each end of the bus bar is spaced apart from the bus bars of other terminals. The foregoing connection structure is only for illustrative purposes, and it may be modified depending on the type of coil winding.

As shown in the drawing, because the terminals are disposed right over the ends of the corresponding coils, the distance between each coil end and the corresponding terminal can be minimized. Thereby, the length of a lead line of the coil can be reduced, so that part arrangement in the motor housing can be simplified, and the durability thereof can also be improved.

After the two calking parts of each terminal have been connected with the ends of the corresponding coils, the interior of the terminal insert part 177 is filled with insulating material such as silicon. The insulating material functions not only to electrically insulate the terminal and the coils from the outside, but also to prevent the terminal and the coils that are made of metal from being brought into contact with refrigerant and being corroded.

The operation of the embodiment of the present invention will be described. In the following description, detailed descriptions of the compressor apparatus unit and the motor will be omitted because conventional existing techniques can be employed.

First, an assembly method of the embodiment will be described. The assembly of the main housing may be performed by a conventional method. To assemble the motor housing, the stator core is first formed by stacking a plurality of electric steel sheets. Thereafter, the bobbin is mounted to the opposite ends of the stator core, and then 3-phase coils are wound around the bobbin.

Subsequently, the cover 170 is mounted to the bobbin. In detail, as described above, the cover 170 is fixed to the upper portion of the bobbin by locking the hook parts 172 of the cover 170 to the depressions 147a formed in the bobbin. Thereafter, the opposite ends of the coils are led to the space over the cover through the coil leading holes 179 of the cover 170 and fixed to the opposite ends of the corresponding terminals by calking.

After the connection of the terminals and the coils has been completed, the terminals are inserted into the respective terminal insert parts 177, and the terminal insert parts 177 are filled with silicon, thus completing the insulation and installation of the terminals and the coils.

Thereafter, the electrical connection pins are press-fitted into and fixed to the respective connection pin support parts 174 of the terminal. Likewise, the guide pins 196 are inserted into and fixed to the respective guide pin support parts 175. Subsequently, the mounting plate 190 is disposed such that the electrical connection pins and the guide pins pass therethrough, and then the sealing parts 197 are formed on junctions between the electrical connection pins and the mounting plate 190. The gasket 200 is thereafter installed in such a way that it is fixed by the guide pins. Then, the assembly of the stator assembly is completed.

After the electrical connection pins have been fixed to the stator assembly, the stator assembly is fixed in the motor housing by thermal press-fitting. After the thermal press-fitting of the stator assembly has been completed, the mounting plate 190 is fixed to the partition 146 by the fastening bolts. Here, because the mounting plate 190 is not completely fixed to the cover 170, the mounting plate can be spaced apart from the cover by a predetermined distance when the fastening bolts are tightened. Thereby, even after the stator assembly has been fixed in the motor housing by thermal press-fitting, the process of coupling of the mounting plate to the partition can be performed without misalignment of the thermal press-fitted stator from the correct position.

When the coupling process of the mounting plate is completed, the three electrical connection pins are fixed in a state in which they protrude into the controller receiving space. Here, after the controller including the above-mentioned PCB substrate is housed in the controller receiving space, the controller cover 122 is coupled to the motor housing.

Subsequently, the rotor is mounted in the stator core. Here, the one end of the rotating shaft that is fixed to the rotor is supported by the boss 148. The boss 148 is inserted into the second boss insert hole 173 of the cover 170. Likewise, the boss 148 protrudes toward the rotating shaft after passing through the central portions of the mounting plate 190 and the gasket.

Thereby, the length of the rotating shaft 136 can be reduced, compared to that of the case where the boss 148 is disposed on the right side (based on FIG. 1) of the mounting plate 190. Furthermore, the axial length of the rotating shaft of the motor housing can be reduced, compared to the case where the boss 148 is disposed on the right side (based on FIG. 1) of the mounting plate 190. In FIG. 1, the rotating shaft is supported by the sliding bearing in the boss 148.

In detail, as shown in FIG. 1, the boss 148 is disposed to pass through the first to third bass insert holes. If the boss is disposed on the right side (based on FIG. 1) of the gasket 200, the length of the rotating shaft 136 will be increased because the end of the rotating shaft 136 must be inserted into the boss after passing through the first to third boss insert holes.

As such, if the length of the rotating shaft is increased, it becomes difficult to perform a process of centering the rotor on the housing, and the stiffness against the deformation is reduced.

However, in the present embodiment, the boss passes through the first to third boss insert holes and enters the housing, so that the length of the rotating shaft can be reduced. In addition, since the boss is inserted into the first to third boss insert holes, it additionally supports the mounting plate, the cover, and the gasket, thus enhancing the structural stability, and minimizing positional misalignment of the components during the assembly process.

The internal space of the motor housing functions as a low-pressure space in which refrigerant drawn thereinto remains temporarily before it is supplied into a compression chamber defined by the stationary scroll and the rotational scroll. Here, the term "low pressure" means that the pressure of the refrigerant is lower than that when it is completely compressed. The pressure of the refrigerant in the low-pressure chamber may be higher than the atmospheric pressure. Particularly, the pressure of refrigerant such as $CO_2$ which is used in a supercritical cycle is maintained at a very high level in even the low-pressure space, compared to that of the atmospheric pressure.

On the other hand, the controller receiving space has a pressure level similar to that of the atmospheric pressure. Therefore, if under normal conditions, refrigerant and oil that remain in the motor housing may naturally leak into the controller receiving space. However, in the embodiment of the present invention, the mounting plate 190 covers the electrical connection holes 146a that may act as leakage passages. In particular, because the mounting plate 190 is disposed in the low-pressure space, the pressure of the refrigerant is applied thereto. Here, the direction of the application of the pressure is the rightward direction based on the FIG. 1.

Thereby, the mounting plate is forcibly pushed toward the partition, thus sealing the electrical connection holes. Moreover, the fastening bolts also push the mounting plate toward the partition, so that the sealing performance is further increased.

Moreover, because the three electrical connection pins are arranged at regular angular intervals along the circumference of a circle, a sufficient distance can be secured between the electrical connection holes. Consequently, compared to the conventional case where three electrical connection holes are adjacent to each other, the possibility of deformation resulting from pressure can be markedly reduced.

Furthermore, because all of the three electrical connection pins are disposed within a range smaller than a range defined by the outer diameter of the stator, changes in the size and the shape of the motor housing due to the electrical connection pins can be minimized.

The present invention is not limited to the above-mentioned embodiment, and various modifications are possible. For example, the shape of the terminal is not limited to the shape illustrated in the drawings, and the shape thereof can be changed in various ways.

Figure 10:
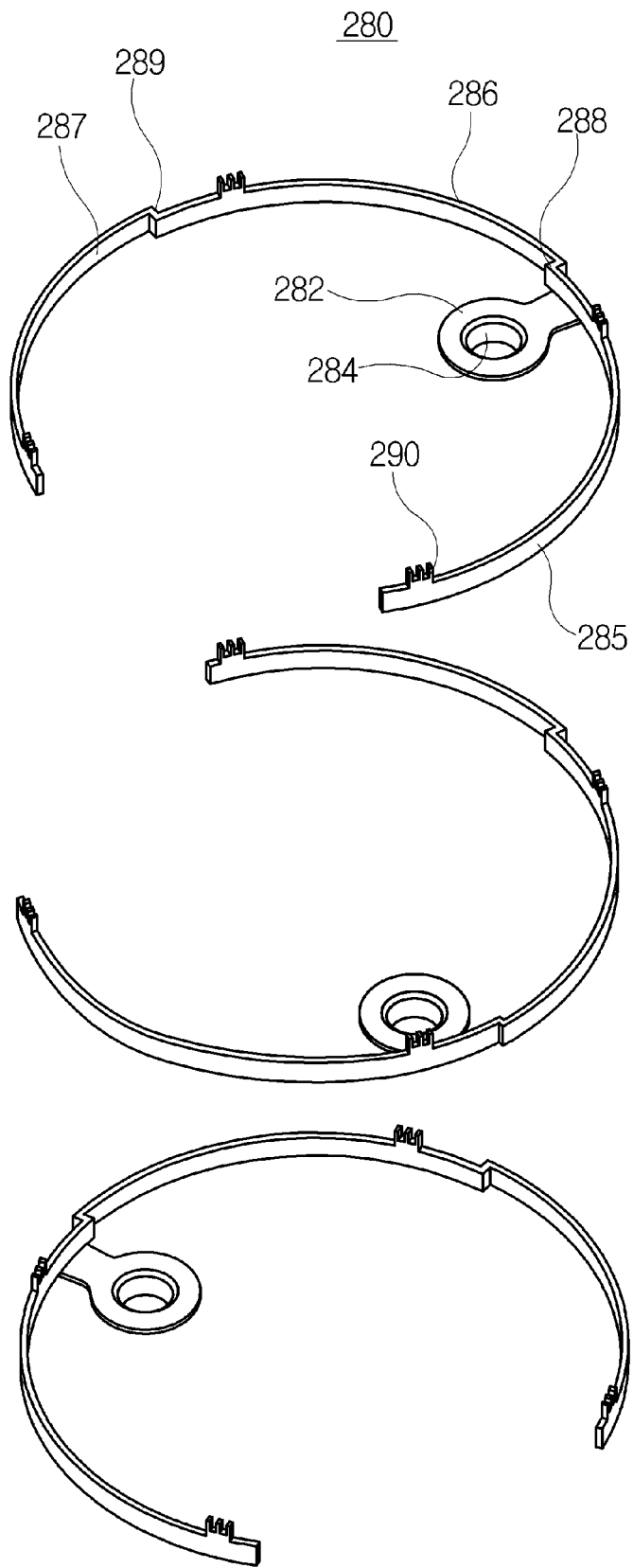
FIG. 10 is a perspective view illustrating a modification of the electrical connection unit shown in FIG. 8.

FIG. 10 illustrates a modification of the terminal. The terminal 280 according to this modification includes a connection pin press-fitting part 282 into which the corresponding electrical connection pin 160 is inserted, and a sleeve 284 extending downward from the connection pin press-fitting part 282. First to third bus bars 285, 286, and 287 are provided on opposite sides of the connection pin press-fitting part 282. The first bus bar 285 is disposed on one side (in a clockwise direction based on FIG. 10) of the connection pin press-fitting part 282, and the second and third bus bars 286 and 287 are disposed on the other side thereof. A first stepped part 288 is provided between the first and second bus bars 285 and 286. A second stepped part 289 is provided between the second and third bus bars 285 and 286. Thereby, the first bus bar is disposed at the innermost side with respect to the radial direction. The second and third bus bars are disposed successively at outer sides with respect to the radial direction.

Each bus bar has a shape similar to the outer shape of the stator, i.e., has an arc shape extending along the circumference of the stator.

In this modification, total three terminals are provided in the same manner as that of the foregoing embodiment. The terminals are disposed such that the bus bars included in the terminals overlap each other in the radial direction, as shown in the drawing. In detail, in space formed by the first stepped part 288 and the second stepped part 289 of each bus bar, the bus bars of other terminals are disposed. Thus, in each space, two bus bars included in different terminals overlap each other in the radial direction.

Furthermore, four coil fixing parts 290 are provided on the first to third bus bars of each terminal. Each coil fixing part 290 has a plurality of teeth so that two coils can be inserted between the teeth and fixed thereto.

Figure 11:
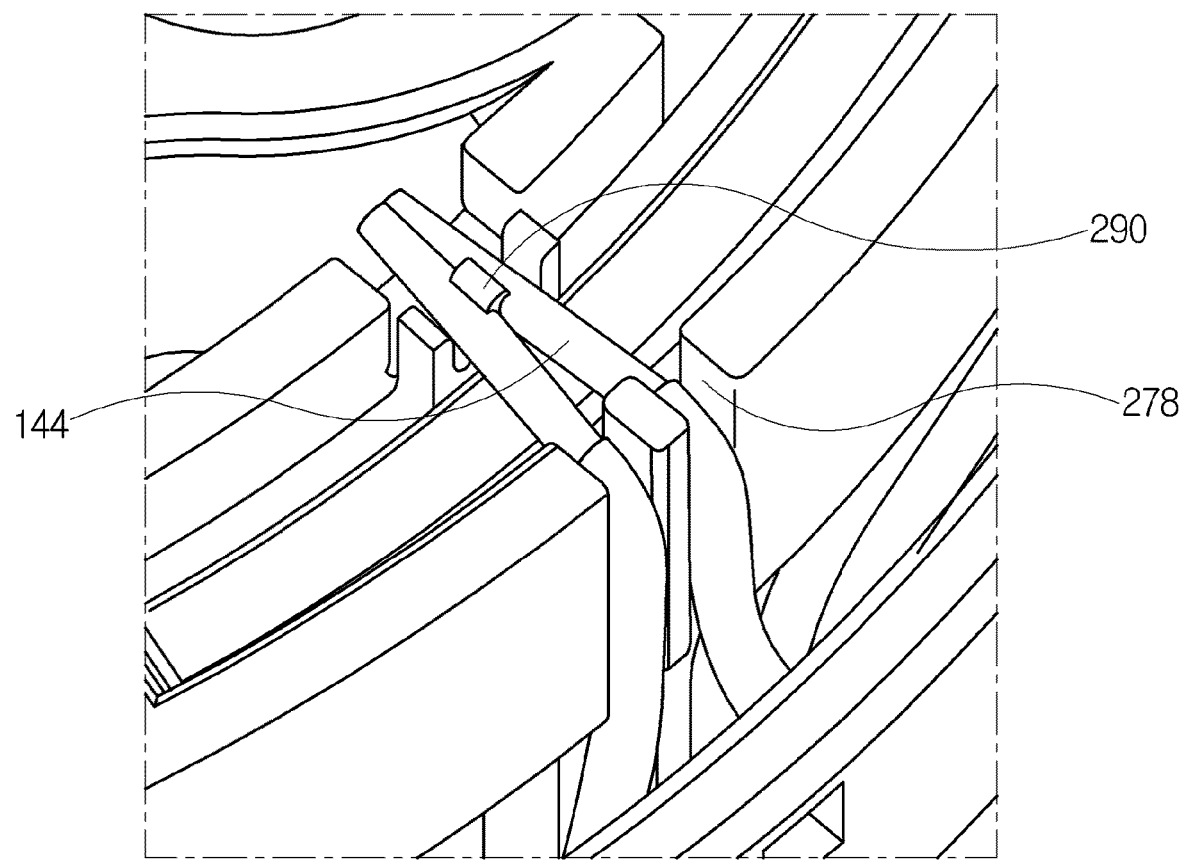
FIG. 11 is a partially enlarged view illustrating electrical connection between a coil and the electrical connection unit shown in FIG. 10.

Referring to FIG. 11, each coil fixing part 290 functions to hold the ends of the coils 144 in such a way that the ends of the coils 144 are inserted between the teeth. The coil fixing part 290 has a function similar to that of the calking part of the embodiment shown in FIG. 8. In addition, a coil guide part 278 for positioning the corresponding coils at the correct position is formed in a portion of the cover 270 that comes into contact with the coils.

Figure 12:
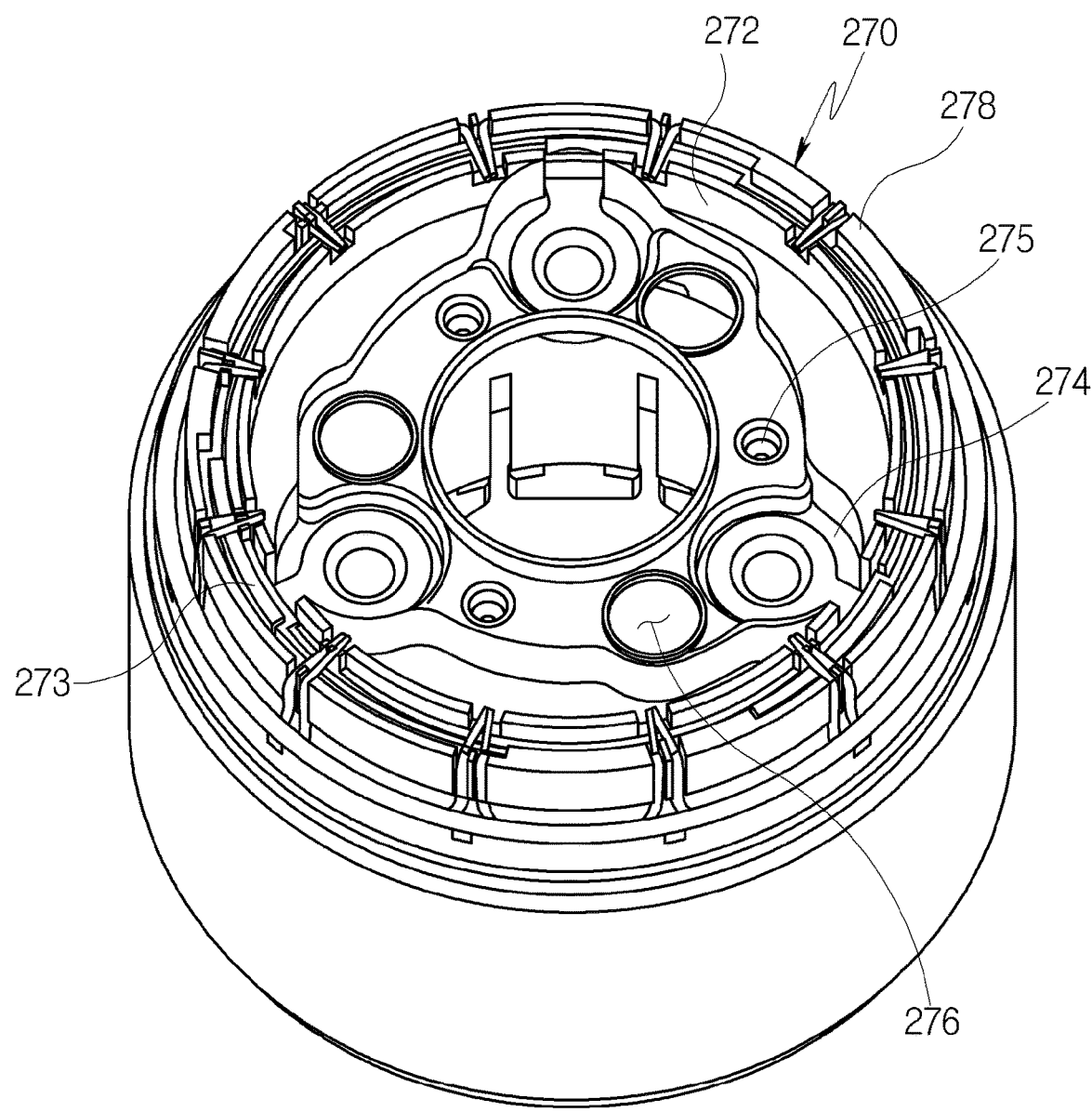
FIG. 12 is a plan view illustrating installation of the electrical connection unit shown in FIG. 11.

Referring to FIG. 12, the cover 270 has an overall shape similar to that of the cover shown in FIG. 6, but unlike the cover of FIG. 6, a bus bar receiving part 272 for receiving the first to third bus bars is defined by the partition and disposed adjacent to the circumferential part of the cover 270. In detail, the bus bar receiving part 272 is provided in the form of a groove disposed adjacent to the circumferential part of the cover. The groove is defined by the partition and the circumferential part of the cover. Here, the groove has an approximately arc shape corresponding to the shape of the bus bars.

Stoppers 273 are provided in the bus bar receive part 272 at positions spaced apart from each other. In detail, each stopper 273 has an arc shape and is disposed such that each of opposite ends thereof comes into contact with one bus bar in the circumferential direction or faces it. Thereby, the stopper 273 comes into contact with either the first or second stepped parts 288 or 289, thus not only positioning the corresponding terminal at the correct position, but also separating the adjacent bus bars from each other without bringing them into contact with each other.

In addition, three connection pin support parts 274 are disposed inside the bus bar receiving part with respect to the radial direction. The connection pin press-fitting parts 282 of the terminals are disposed in the respective connection pin support parts 274. In the same manner as the cover of FIG. 8, a guide pin support part 275 and a bolt insert hole 276 are provided in each of spaces between the connection pin support parts 274. Furthermore, the coil guide part 278 is circumferentially provided on the circumferential part of the cover 270.

In the terminal having the above-mentioned configuration, because the coils are connected at a plurality of positions to the bus bars dispersed to the left and the right, not only can the length of a lead line from each coil end be further reduced, but the housing and the coil can also be prevented from coming into contact with each other. Furthermore, the bus bars diverge in both directions from the connection pin press-fitting part to disperse current. Therefore, the surface area of each bus bar can be reduced.

Although some detailed embodiments of the present invention have been described above, the embodiments have been provided to describe the present invention in detail, and the present invention is limited to the embodiments. It is evident to those skilled in the art that the present invention may be modified or improved within the technical spirit of the present invention.

Such a simple modification or change of the present invention falls within the scope of the present invention, and a detailed scope of the present invention will become evident by the appended claims.

The invention claimed is:

1. An electric compressor comprising:
   a compression unit configured to compress working fluid;
   an electrically-driven unit configured to drive the compression unit, and including a stator fixed in an inner surface of a housing, and a rotor rotatably disposed inside the stator;
   the housing including a partition provided to define a space in which the electrically-driven unit is received;
   a plurality of electrical connection pins connected electrically to the electrically-driven unit, and disposed through the partition in a longitudinal direction of the housing; and
   a controller disposed on a rear surface of the partition,
   a mounting plate to which the plurality of electrical connection pins are fixed, and which has a surface facing the housing, wherein the mounting plate is fixed relative to the stator;
   a cover having a first surface fixed to the stator, and a second surface into and to which the mounting plate is inserted and fixed; and
   wherein the plurality of electrical connection pins are disposed in the form of a triangle on the partition.

2. The electric compressor of claim 1, further comprising a fixing unit configured to fix the mounting plate to the partition, wherein the fixing unit is disposed so as to be approachable in the housing.

3. The electric compressor of claim 2, wherein the fixing unit comprises a plurality of bolts, and a head of each of the bolt is disposed in the housing.

4. The electric compressor of claim 1, wherein each of the plurality of electrical connection pins has a first end fixed to the mounting plate, and a second end disposed to pass through the partition and protrude toward the controller.

5. The electric compressor of claim 1, wherein the plurality of electrical connection pins are directly electrically connected with a coil provided on the stator.

6. The electric compressor of claim 1, further comprising an electrical connection unit configured to electrically connect the electrical connection pins with a coil provided on the stator.

7. The electric compressor of claim 6, wherein the electrical connection unit is fixed to the cover.

8. The electric compressor of claim 6, wherein the electrical connection unit includes a first side connected with the coil provided on the stator, and a second side having an insert hole into which a corresponding one of the electrical connection pins is inserted.

9. The electric compressor of claim 1, wherein the plurality of electrical connection pins are circumferentially disposed around a driving shaft provided in the electrically-driven unit.

10. The electric compressor of claim 1, wherein ends of the electrical connection pins that are disposed inside the housing remain fixed between the stator and the partition by the cover.

11. An electric compressor comprising:
a compression unit configured to compress working fluid;
an electrically-driven unit configured to drive the compression unit, and comprising a stator, and a rotor rotatably disposed inside the stator;
a controller configured to control operation of the electrically-driven unit;
a housing in which the stator of the electrically-driven unit is fixed, and which includes a partition provided to define a motor receiving space and a controller receiving space; and
a plurality of electrical connection pins configured to pass through the partition and electrically connect the electrically-driven unit with the controller,
a mounting plate to which the plurality of electrical connection pins are fixed, and which has a surface facing the housing, wherein the mounting plate is fixed relative to the stator;
a cover having a first surface fixed to the stator, and a second surface into and to which the mounting plate is inserted and fixed;
wherein the plurality of electrical connection pins are disposed on the partition in a circular region having a diameter less than an outer diameter of the stator.

12. The electric compressor of claim 11,
wherein a boss configured to receive a rotating shaft coupled to the rotor is provided on a motor receiving space-side surface of the partition, and
wherein a diameter of the circular region is larger than an outer diameter of the boss.

13. The electric compressor of claim 12, wherein the plurality of electrical connection pins are disposed on a circumference of a circle.

14. The electric compressor of claim 13, wherein the plurality of electrical connection pins are disposed at angular intervals of 120°.

15. The electric compressor of claim 11, wherein, when the number of electrical connection pins is n, the circular region is partitioned into n regions at angular intervals of 360/n°, and one electrical connection pin is disposed in each of the partitioned regions.

16. A stator assembly comprising:
a stator core;
a coil wound around the stator core;
a plurality of electrical connection pins electrically connected with the coil, and extending in a longitudinal direction of the stator core; and
a fixing unit configured to fix the plurality of electrical connection pins such that the electrical connection pins face one end of the stator core
a cover having a first surface fixed to the stator, and a second surface into and to which the mounting plate is inserted and fixed
wherein the fixing unit comprises a mounting plate to which the plurality of electrical connection pins are fixed; and
wherein the fixing unit comprises a cover configured to fix the mounting plate to the one end of the stator core.

17. The stator assembly of claim 16, wherein the cover has an annular shape with an opening in a central portion thereof, and the electrical connection pins are disposed to face one surface of the cover.

* * * * *